(12) United States Patent
Mizuno et al.

(10) Patent No.: US 6,834,885 B2
(45) Date of Patent: Dec. 28, 2004

(54) INFLATOR

(75) Inventors: Hideki Mizuno, Shiga (JP); Kanji Yano, Shiga (JP)

(73) Assignee: Takata Corporation, Tokyo (JP)

( * ) Notice: Subject to any disclaimer, the term of this patent is extended or adjusted under 35 U.S.C. 154(b) by 4 days.

(21) Appl. No.: 10/041,763

(22) Filed: Jan. 10, 2002

(65) Prior Publication Data
US 2002/0093182 A1 Jul. 18, 2002

(30) Foreign Application Priority Data
Jan. 15, 2001 (JP) .................................... 2001-006583

(51) Int. Cl.$^7$ .............................................. B60R 21/26
(52) U.S. Cl. .................. 280/737; 280/740; 280/741; 280/742
(58) Field of Search ................ 280/736, 737, 280/740, 741, 742

(56) References Cited

U.S. PATENT DOCUMENTS

| | | | | |
|---|---|---|---|---|
| 3,690,695 A | * | 9/1972 | Jones et al. | 280/741 |
| 3,791,302 A | * | 2/1974 | McLeod | 102/201 |
| 4,006,919 A | * | 2/1977 | Neuman | 280/736 |
| 4,203,616 A | * | 5/1980 | Okada | 280/737 |
| 4,268,065 A | * | 5/1981 | Granig | 280/737 |
| 4,289,327 A | * | 9/1981 | Okada | 280/737 |
| 5,022,674 A | | 6/1991 | Frantom et al. | |
| 5,076,607 A | | 12/1991 | Woods et al. | |
| 5,152,550 A | | 10/1992 | Hoagland et al. | |
| 5,257,819 A | | 11/1993 | Frantom et al. | |
| 5,322,326 A | * | 6/1994 | Ohm | 280/737 |
| 5,344,186 A | * | 9/1994 | Bergerson et al. | 280/741 |
| 5,421,609 A | * | 6/1995 | Moore et al. | 280/737 |
| 5,472,231 A | * | 12/1995 | France | 280/733 |
| 5,513,572 A | | 5/1996 | Frantom et al. | |
| 5,529,333 A | * | 6/1996 | Rizzi et al. | 280/737 |
| 5,536,040 A | * | 7/1996 | Cuevas et al. | 280/737 |
| 5,590,906 A | * | 1/1997 | Faigle et al. | 280/741 |
| 5,622,381 A | * | 4/1997 | Mossi et al. | 280/737 |
| 5,642,902 A | * | 7/1997 | France | 280/737 |
| 6,022,045 A | * | 2/2000 | Faigle | 280/736 |
| 6,142,514 A | * | 11/2000 | Yamato et al. | 280/736 |
| 6,206,418 B1 | * | 3/2001 | Perotto et al. | 280/736 |
| 6,412,811 B1 | * | 7/2002 | Campbell et al. | 280/730.2 |
| 6,543,806 B1 | * | 4/2003 | Fink | 280/737 |
| 6,755,439 B2 | * | 6/2004 | Nanbu | 280/737 |

FOREIGN PATENT DOCUMENTS

| | | |
|---|---|---|
| EP | 0 512 747 | 11/1992 |
| EP | 0 604 001 | 6/1994 |

* cited by examiner

Primary Examiner—Ruth Ilan
Assistant Examiner—Toan C To
(74) Attorney, Agent, or Firm—Manabu Kanesaka

(57) ABSTRACT

An inflator includes a bottle for storing a high pressure gas having an opening, a sealing plate attached to the bottle for sealing the opening, a housing having a curved air passage therein and being arranged such that an end faces the sealing plate, an initiator for generating an air blast disposed to communicate with the air passage, and a piston provided inside the housing to communicate with the curved air passage. Upon actuation of the initiator, the piston is urged toward the sealing plate by the air blast to rupture the same to allow the high pressure gas to linearly eject from the bottle.

13 Claims, 6 Drawing Sheets

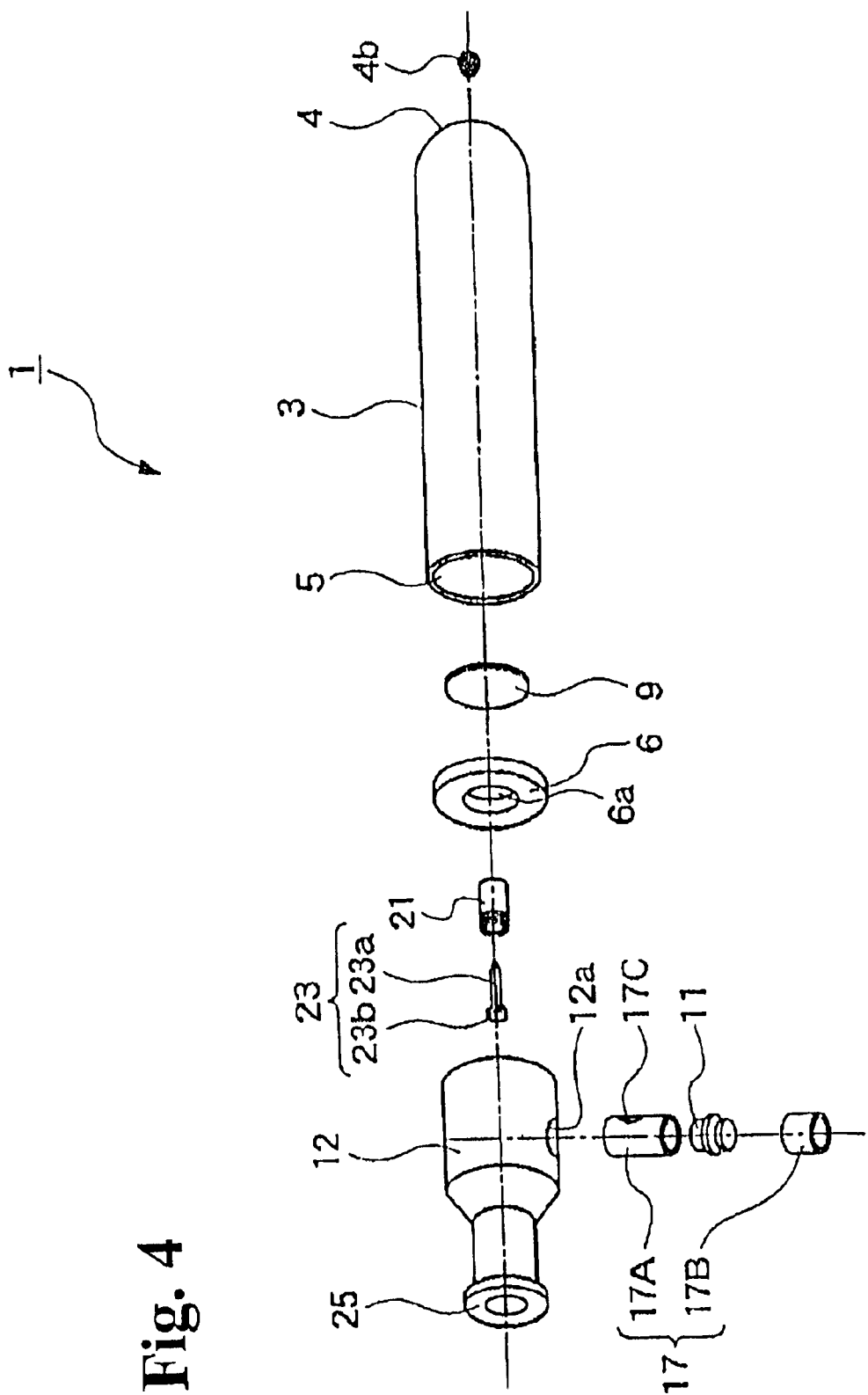

US 6,834,885 B2

INFLATOR

BACKGROUND OF THE INVENTION AND RELATED ART STATEMENT

The present invention relates to an inflator that generates a gas for inflating an air bag of a vehicle. More specifically, the present invention relates to an inflator having an advantage in that the gas can be ejected and supplied linearly in the axial direction of a bottle.

Inflators are gas generators that generate a gas for inflating air bags of vehicles. Inflators can be broadly divided into two groups: an inflator that ejects a high pressure gas contained in a container and supply it to an air bag (hybrid type and stored gas type), and an inflator that burns a gas generating agent (propellant) and generates a gas by utilizing a chemical reaction (combustion type).

An example of a stored gas type inflator is shown in FIG. 6. FIG. 6 is a sectional view schematically showing an inflator disclosed in Japanese Patent Application Publication No. 10-250525 as an example of a conventional stored gas type inflator.

With reference to the figure, an inflator 100 contains a bottle 101 that is filled with a high pressure gas. One end (the right end in the figure) 102 of the bottle 101 is closed and the other end (the left end in the figure) 103 of the bottle 101 is open. A sleeve 109 is connected to the open end 103 of the bottle 101 via an annular ring 106. An inner end of the ring 106, which forms an inside hole 106a, protrudes from the interior surface of the bottle 101 and the sleeve 109.

A burst disk 107 is attached to the ring 106 at the left side (the side facing the sleeve 109) thereof by welding, etc. The burst disk 107 is constructed of a steel plate having a thickness of approximately 0.3 mm. The burst disk 107 receives the filling pressure of the gas contained in the bottle 101 and swells toward the sleeve 109. In a normal state in which the inflator 100 is not activated, the bottle 101 is sealed by the burst disk 107.

A plurality of gas outlets 104, through which the high pressure gas is expelled when the inflator 100 is activated, is formed in the exterior surface of the sleeve 109. A housing 110 is attached to the sleeve 109 at the end (the left end in the figure) thereof. The housing 110 includes an initiator fixing member 110a, which is fit in the sleeve 109 at the end thereof, and a cylindrical portion 110b that protrudes from the initiator fixing member 110a. An initiator 112 is fixed inside the initiator fixing member 110a of the housing 110. A tip portion (at the right end) 112a of the initiator 112 is inserted beyond the initiator fixing member 110a into the cylindrical portion 110b. A terminal (at the left end) 112b of the initiator 112 is connected to a control unit via electric wires (not shown).

A piston 115 with a sharply pointed tip 115a is disposed inside the cylindrical portion 110b of the housing 110. A hole 115b is formed in the piston 115 at the rear end thereof, and the tip portion 112a of the initiator 112 is disposed in the hole 115b. A tip 110c of the cylindrical portion 110b of the housing 110 is separated from the burst disk 107 by a predetermined distance as shown in the figure.

An air bag (not shown) is attached to the inflator 100 in such a manner that the air bag is communicated via the gas outlets 104. In a normal situation, the gas contained in the bottle 101 is sealed by the burst disk (sealing plate) 107. When a vehicle collides, a sensor (not shown) is activated and the initiator 112 generates an air blast, so that the piston 115 is pushed to the right in the figure. The tip 115a of the piston 115 breaks the burst disk 107 at the midsection thereof, so that the entire body of the burst disk 107 is ruptured and opened widely. Then, the high pressure gas contained in the bottle 101 flows into the sleeve 109. The gas is ejected through the gas outlets 104 formed in the exterior surface of the sleeve 109 and supplied to the air bag.

In the above-described conventional inflator 100, the initiator 112, the piston 115, and the burst disk 107 are arranged such that the centers thereof are linearly arranged, and the piston 115 which is pushed by the air blast generated by the initiator 112 moves straight ahead and breaks the burst disk 107. However, in the above-described construction, the direction in which the gas flows into the sleeve 109 through the open end 103 of the bottle 101 (the horizontal direction in the figure) is approximately perpendicular to the direction in which the gas is ejected through the gas outlets 104 of the sleeve 109 into the air bag (the vertical direction in the figure). Accordingly, there is a problem in that the gas can not flow linearly and smoothly, and an additional component is necessary for changing the flowing direction of the gas.

In order to solve this problem, in Japanese Patent Application Publication No. 9-58394, a gas generator in which a gas can be ejected in the axial direction of a bottle from the closed end (the end opposite to the end closer to an initiator) toward the other is disclosed. However, in the gas generator of the above-described publication, there is a problem in that the size and the manufacturing cost thereof are increased since an additional large housing which contains the entire apparatus including the bottle is necessary.

In view of the above-described situation, an object of the present invention is to provide an inflator wherein a gas can be ejected and supplied linearly in the axial direction of a bottle without increasing the size and the manufacturing cost thereof.

SUMMARY OF THE INVENTION

To solve the problems described above, according to one aspect of the present invention, an inflator comprises a bottle with an opening and filled with a high pressure gas; a sealing plate which seals the opening of the bottle; an initiator which generates an air blast for providing driving force to break the sealing plate; a piston which is accelerated by the air blast generated by the initiator, and breaks the sealing plate; and a curved passage which guides the air blast generated by the initiator to the piston.

According to the present invention, the air blast generated by the initiator moves non-linearly through the curved passage, and then pushes and accelerates the piston. Then, the accelerated piston breaks the sealing plate, and the high pressure gas contained in the bottle is ejected. Since it is not necessary to dispose the initiator in the axial direction of the bottle, design flexibility can be increased. For example, the high pressure gas can be ejected and supplied linearly in the axial direction of the bottle.

According to another aspect of the present invention, an inflator comprises a bottle with an opening and filled with a high pressure gas; a sealing plate which seals the opening of the bottle; an initiator which generates an air blast for providing a driving force to break the sealing plate; and a piston which is accelerated by the air blast generated by the initiator and breaks the sealing plate. The bottle is a cylindrical shape, and the initiator is disposed in front of the opening of the bottle. A cylindrical diffuser provided with a gas outlet is connected to the bottle in the extending direction thereof. In addition, the initiator is attached to the circumferential surface of the diffuser and the gas outlet is formed in the diffuser at the end opposite to the end closer to the bottle.

According to the present invention, the initiator is disposed in front of the opening of the bottle and is attached to the circumferential surface of the diffuser. Thus, the initiator is not disposed in the direction in which the high pressure gas is ejected. Accordingly, the high pressure gas can be ejected and supplied linearly in the axial direction of the bottle. The high pressure gas which comes out from inside the bottle flows linearly through the diffuser and is ejected through the gas outlet formed in the diffuser at the end opposite to the end closer to the bottle.

An inflator of the present invention may further comprise a barrel having an inside hole which guides the piston, and the end surface of the barrel which is closer to the bottle may contact the sealing plate.

In such a case, the barrel supports a considerable percentage of the filling pressure of the gas contained in the bottle. Thus, even a relatively thin sealing plate can sustain a high pressure. After the sealing plate breaks, the gas flows through the space between the interior surface of the diffuser and the exterior surface of the barrel, and is then ejected through the gas outlet.

BRIEF DESCRIPTION OF THE DRAWINGS

FIG. 4 is an exploded sectional view of the inflator;

FIGS. 5(A)–5(F) are schematic drawings showing modifications of a piston and a barrel of the inflator according to the present invention, wherein FIGS. 5(A) and 5(B) are perspective views showing modifications of the piston, FIGS. 5(C) and 5(D) are perspective views showing modifications of the barrel, FIG. 5(E) is a sectional view of the barrel of FIG. 5(D) with the piston before activation, and FIG. 5(F) is a sectional view similar to FIG. 5(E) after activation.

DETAILED DESCRIPTION OF PREFERRED EMBODIMENTS

Figure 1:
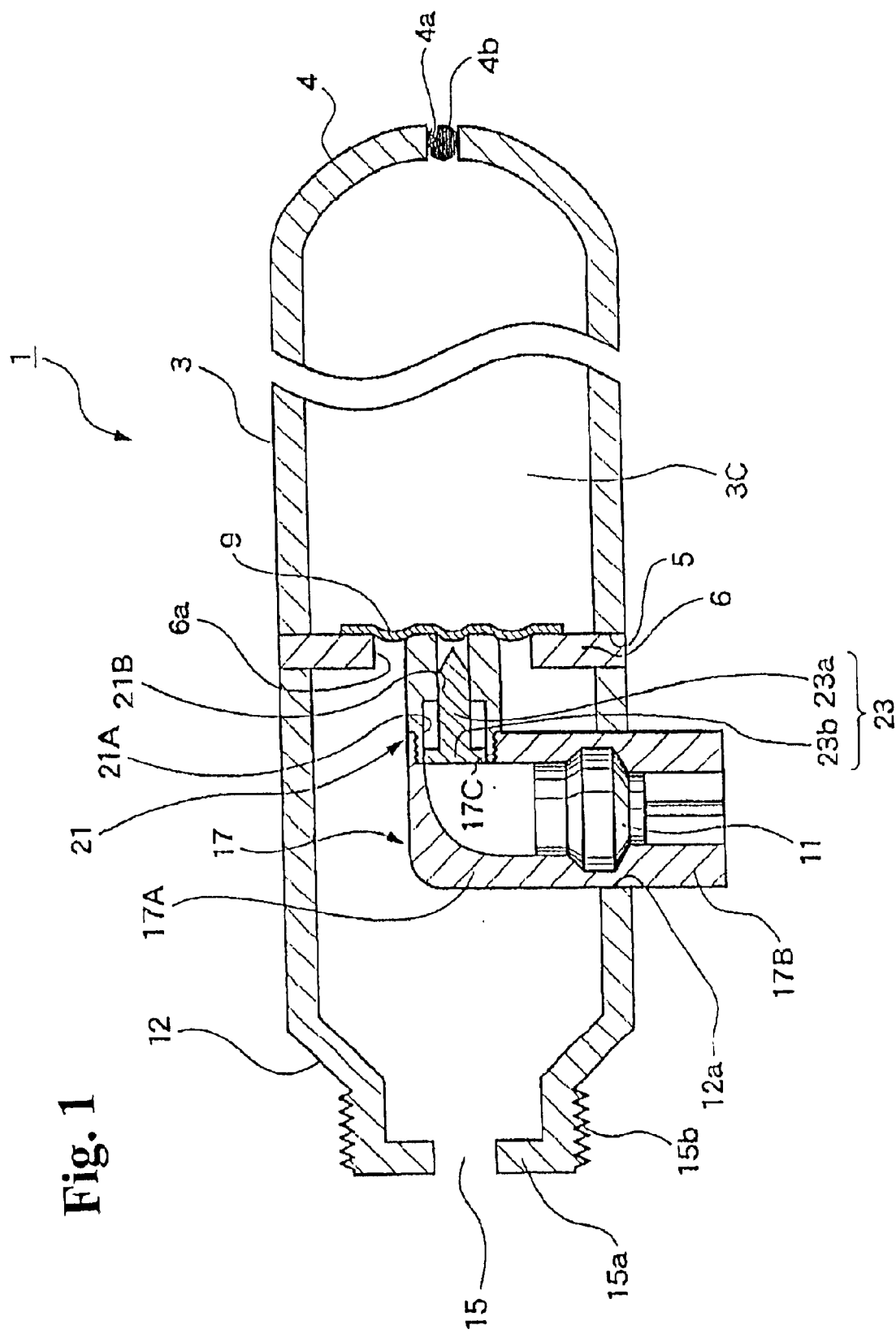
FIG. 1 is a sectional view of an inflator according to an embodiment of the present invention in a state before the inflator is activated.

The present invention will be further explained with reference to the accompanied drawings.

In these drawings, an inflator 1 includes a cylindrical steel bottle 3. The bottle 3 has a hemispherical right end portion 4 and an opening 5 at the left end thereof. A hole 4a is formed in the end portion 4 of the bottle 3, and a gas, such as an inert gas, is injected into an interior 3C of the bottle 3 through the hole 4a at a high pressure. After the interior 3C of the bottle is filled with the gas, the hole 4a is blocked by a steel ball 4b to seal the gas.

Figure 2:
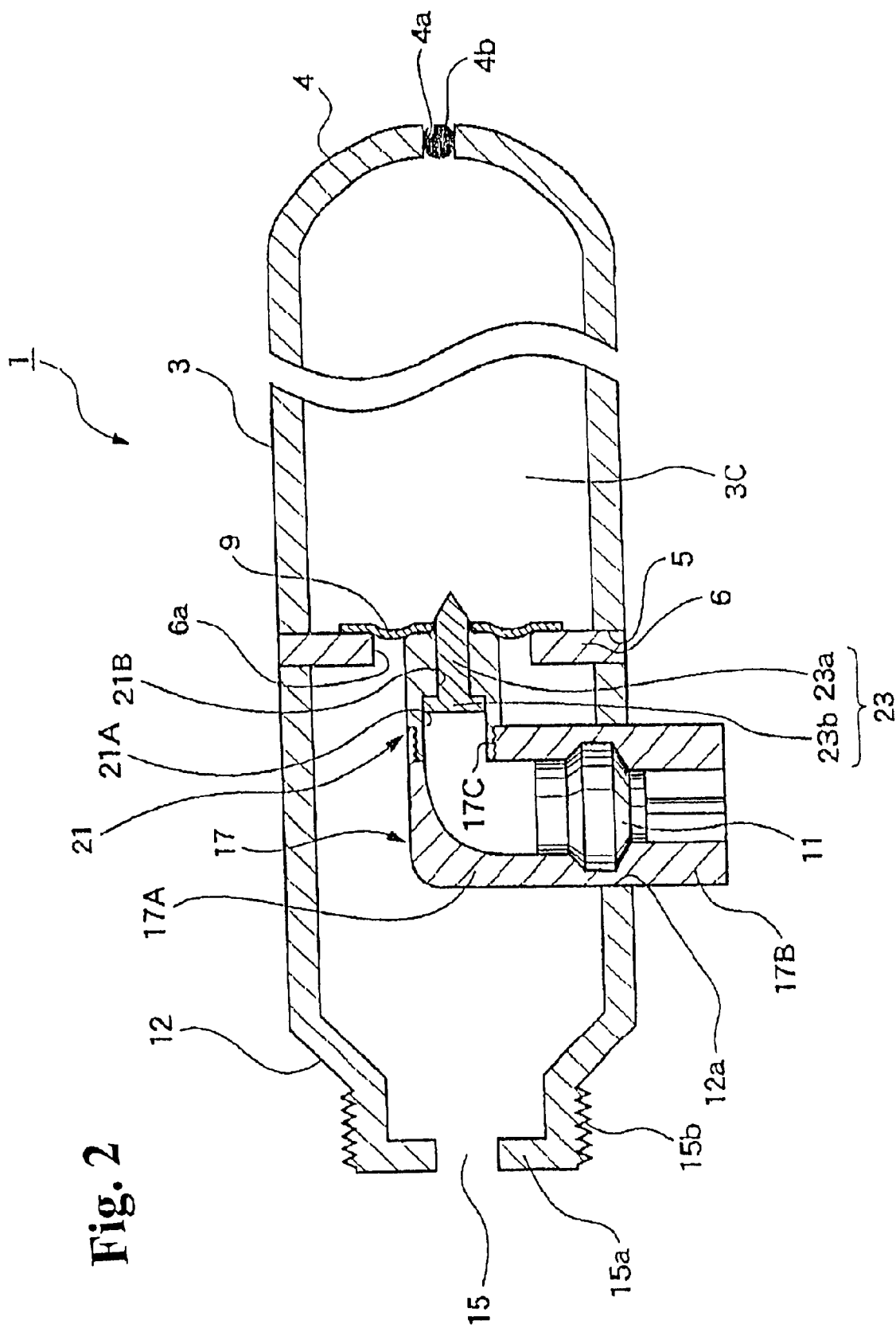
FIG. 2 is a sectional view of the inflator in a state immediately after the inflator is activated.
Figure 3:
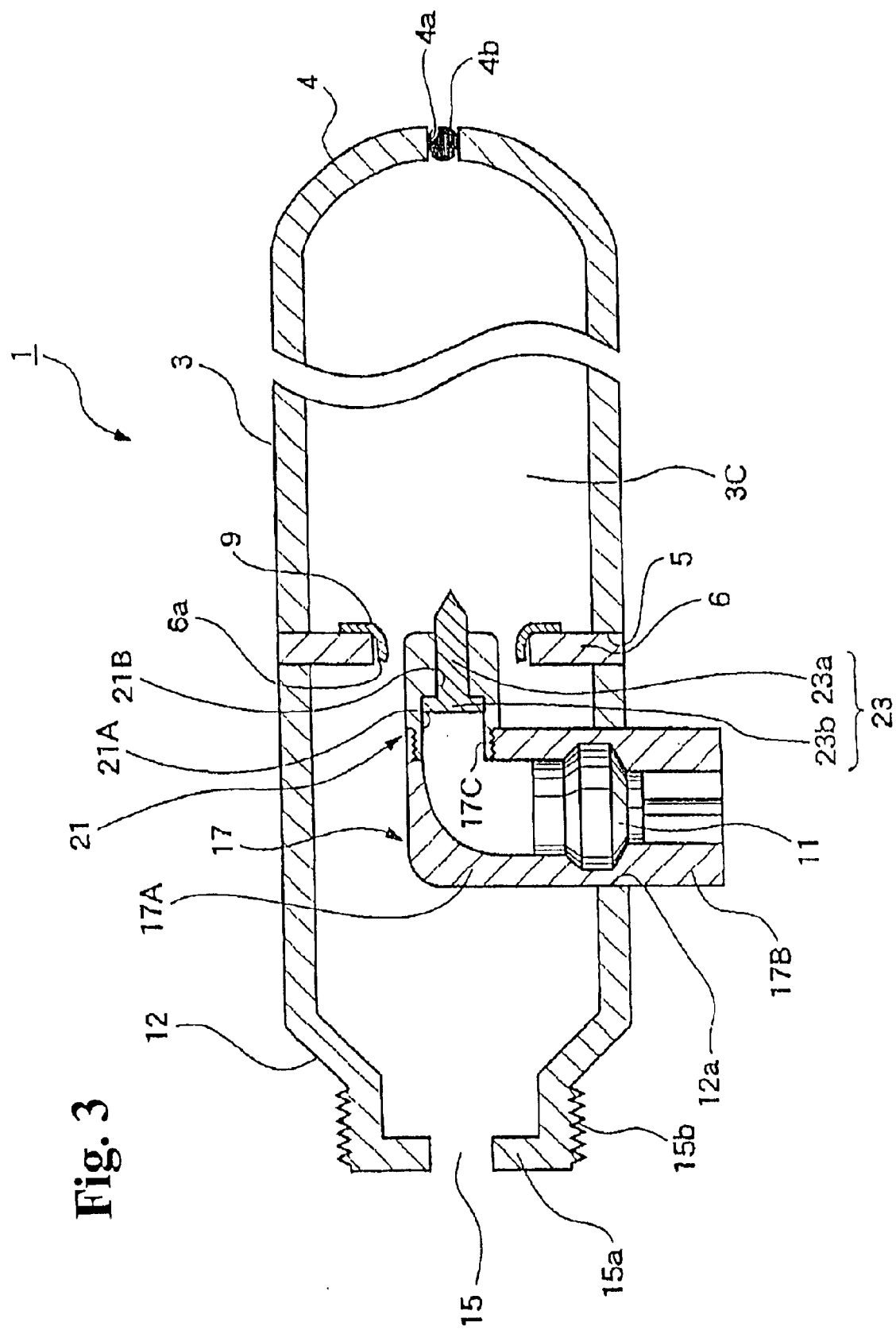
FIG. 3 is a sectional view of the inflator in a state in which the sealing plate breaks.

A diffuser 12 is connected to the opening 5 of the bottle 3 via an annular ring 6 constructed of a steel plate. The bottle 3, the ring 6, and the diffuser 12 all have the same outside diameter and are joined together by welding, etc. As shown in FIGS. 1 to 3, the inner end of the ring 6, which forms an inside hole 6a, protrudes from the interior surface of the bottle 3 and the diffuser 12. A sealing plate (burst disk) 9, which is constructed of a disk-shaped steel plate, is attached to the ring 6 at the right side (the side facing the bottle 3) thereof by welding, etc. The inside hole 6a of the ring 6 (the opening 5 of the bottle 3) is sealed by the sealing plate 9. The thickness of the sealing plate 9 is typically 0.2 to 0.4 mm.

The diffuser 12 is a cylindrical member formed of steel and the right end portion (a portion connected to the ring 6) thereof has the shape of a straight cylinder. The diffuser 12 is tapered toward the left end thereof, and a gas outlet 15 is formed at the left side of the tapered portion. When the inflator 1 is activated, the high pressure gas contained in the bottle 3 is ejected through the gas outlet 15. An inner flange 15a is formed at the end of the gas outlet 15, and an external thread 15b is formed in the exterior surface thereof. The external thread 15b is engaged with a fixing flange 25 (in FIG. 4), which is provided for securing an open end of an air bag (not shown).

A through hole 12a is formed in the circumferential surface (the bottom surface in the figures) of the diffuser 12, and a housing 17 is inserted through the through hole 12a. As shown in FIG. 4, the housing 17 includes an inside part 17A, which is disposed inside the diffuser 12, and an outside part 17B, which is disposed outside the diffuser 12. The inside and outside parts 17A and 17B are joined together by screw joint, welding, press-fitting, etc. The upper surface of the housing 17 (the upper surface of the inside part 17A) is closed, and the bottom surface thereof (the bottom surface of the outside part 17B) is open.

An initiator 11 is retained in the outside part 17B of the housing 17, and an end portion of the initiator 11 is inserted in the inside part 17A. The initiator 11 is connected to a control unit (not shown) via an electric wire. The initiator 11 generates an air blast that provides a driving force for braking the sealing plate 9 when the inflator 1 is activated.

As is comprehensively shown in FIG. 4, a through hole 17C is formed in the right surface of the inside part 17A of the housing 17 at the right side thereof. An internal thread is formed in the inner periphery of the through hole 17C, and a barrel 21 having a cylindrical shape is screwed into the through hole 17C. As shown in FIGS. 1 to 3, in the state in which the housing 17 and the barrel 21 are joined, they are constructed like a reducing elbow having a curved passage therein. One end of the barrel 21 (the right end in FIG. 1) contacts the side surface of the sealing plate 9 at the left side thereof. Accordingly, the barrel 21 supports a considerable percentage of the filling pressure applied to the sealing plate 9 by the gas contained in the bottle 3. Thus, the sealing plate 9 having a relatively small thickness such as 0.2 to 0.4 mm can sustain a high pressure.

As shown in FIGS. 1 to 3, the barrel 21 has an inside hole which includes a large diameter portion 21A at the side close to the housing 17 and a small diameter portion 21B at the side close to the sealing plate 9. A piston 23, which includes a shaft portion 23a and a flange portion 23b, is disposed inside the inside hole of the barrel 21 so that the piston 23 can slide in the inside hole. The outside diameter of the shaft portion 23a is slightly smaller than the inside diameter of the small diameter portion 21B, and the outside diameter of the flange portion 23b is slightly smaller than the inside diameter of the large diameter portion 21A. The tip of the piston 23 is sharply pointed.

Next, the operation of the inflator 1 having the above-described construction will be described below.

As shown in FIG. 1, in a normal state in which the inflator 1 is not activated, the interior 3C of the bottle 3 is filled with the gas and is sealed by the sealing plate 9. The sealing plate 9 serves to prevent the gas from leaking through the opening 5 of the bottle 3. The piston 23 is retained in the barrel 21 at a predetermined position shown in FIG. 1. In this state, the right end of the barrel 21 is in contact with the sealing plate 9, and the tip of the piston 23 is separated from the sealing plate 9.

When a vehicle receives an impact, the inflator 1 is activated and the high pressure gas contained in the bottle 3 is supplied to the air bag (not shown). In such an emergency situation, the control unit (not shown) sends an electric signal, and the initiator 11 generates an air blast based on the signal. As shown in FIG. 2, the blast air flows inside the inside part 17A of the housing 17 and the large diameter portion 21A of the barrel 21 along the curved passage, so that the piston 23 is pushed to the right in the figure.

Then, as shown in FIG. 3, the tip of the piston 23, which is pushed by the air blast, breaks the sealing plate 9. The sealing plate 9 ruptures and the high pressure gas contained in the bottle 3 starts flowing out through between the exterior surface of the barrel 21 and the inside hole 6a of the ring 6 into the diffuser 12. The gas is then ejected and supplied to the air bag (not shown) through the gas outlet 15. Accordingly, the air bag is inflated. As described above, during the time in which the gas comes out from the bottle 3, flows inside the diffuser 12, and is supplied into the air bag, the gas flows linearly. The piston 23 pushed by the air blast generated by the initiator 11 is stopped when the flange portion 23b encounters the step portion between the large diameter portion 21A and the small diameter portion 21B inside the barrel 21.

Next, modifications of the piston and the barrel will be described below.

Figure 5A:
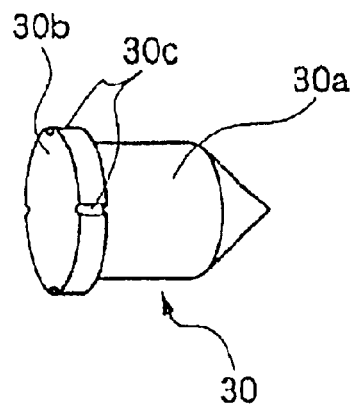
Figure 5B:
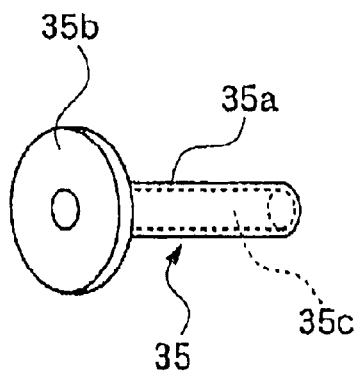
Figure 5C:
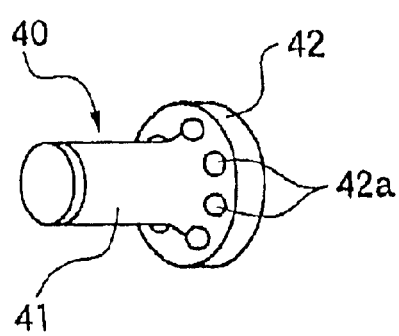
Figure 5D:
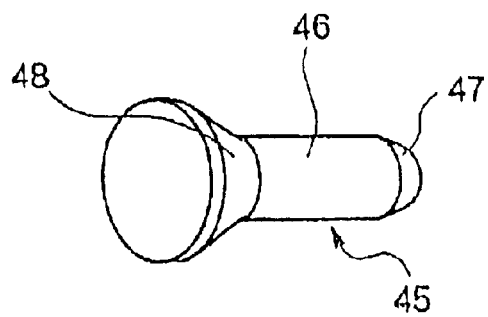
Figure 5E:
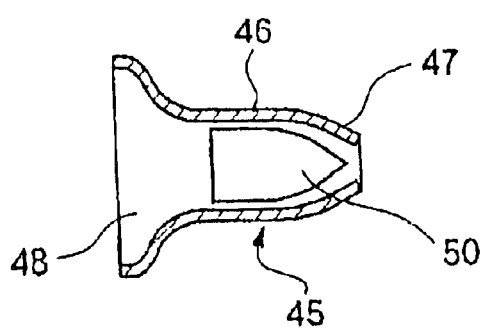
Figure 5F:
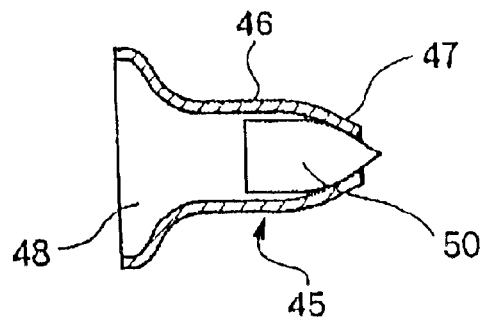
Figure 6:
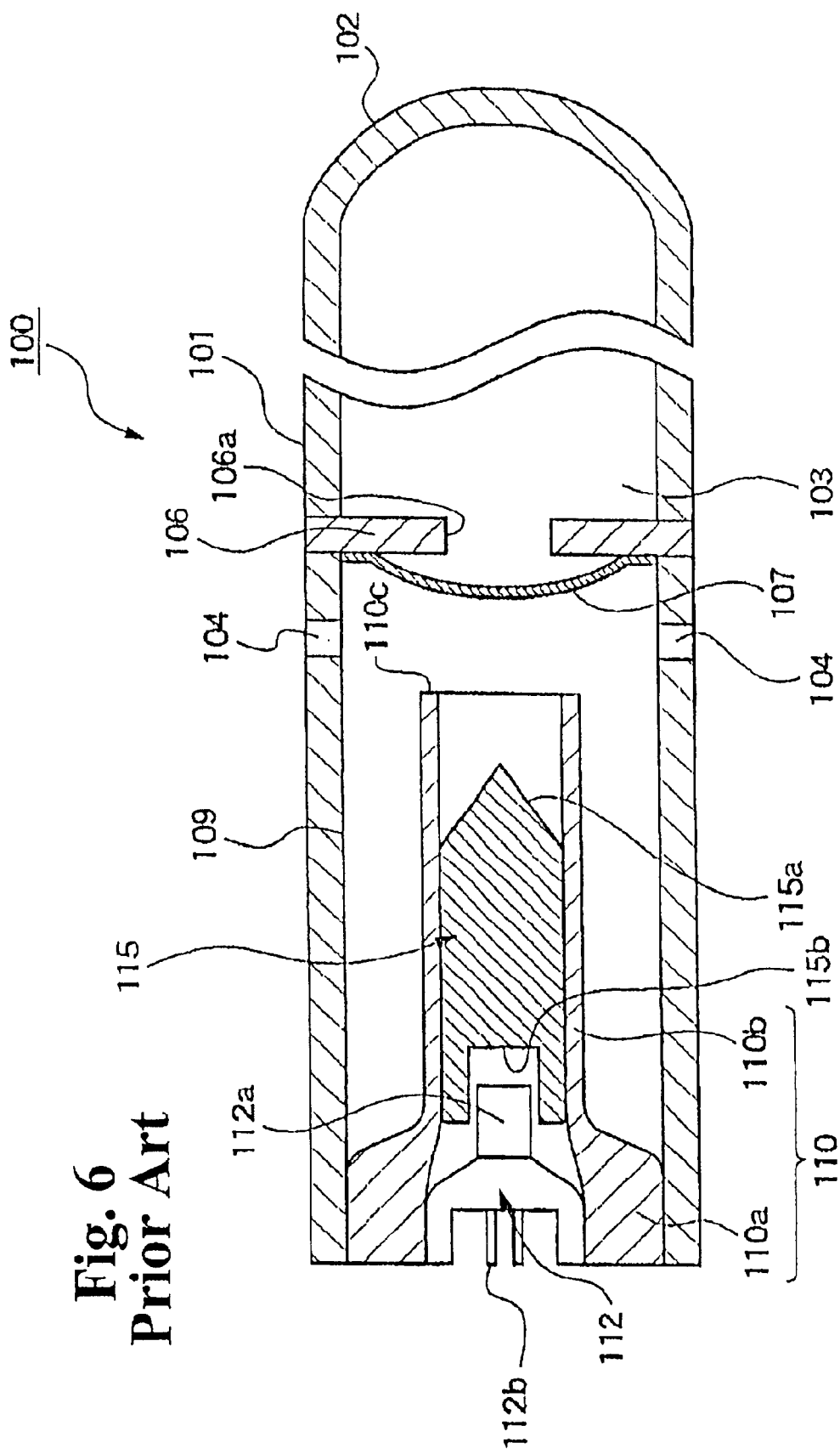
FIG. 6 is a sectional side view schematically showing an inflator disclosed in Japanese Patent Application Publication No. 10-250525 as an example of a conventional stored.

FIGS. 5(A)–5(F) are schematic drawings that show modifications of the piston and the barrel. FIGS. 5(A) and 5(B) are perspective views showing modifications of the piston of the inflator according to the present invention, and FIGS. 5(C) and 5(D) are perspective views showing modifications of the barrel of the inflator according to the present invention. In addition, FIG. 5(E) is a sectional view of the barrel shown in FIG. 5(D) with the piston before activation, and FIG. 5(F) is a sectional view similar to FIG. 5(E) after activation.

A piston 30 shown in FIG. 5(A) includes a shaft portion 30a and a flange portion 30b. The tip of the shaft portion 30a is sharply pointed. A plurality of grooves 30c is formed in the peripheral surface of the flange portion 30b along the thickness direction thereof. In the piston 30, when the initiator is activated, air partially flows through the grooves 30c toward the tip of the piston 30. Thus, the internal pressure of the barrel is reduced, so that the pressure resistance of the barrel can be relatively low.

A piston 35 shown in FIG. 5(B) includes a shaft portion 35a and a flange portion 35b. A hollow portion 35c is formed along the shaft center (the center of the shaft portion 35a and the flange portion 35b) of the piston 35. In the piston 35, when the initiator is activated, air flows through the hollow portion 35c toward the sealing plate, so that the midsection of the sealing plate ruptures such that a circular hole is formed therein. Accordingly, the sealing plate always breaks in a similar manner.

A barrel 40 shown in FIG. 5(C) includes a cylindrical main body 41, and a flange 42 is formed at the end of the main body 41 which is closer to the bottle (the end closer to the sealing plate, or the right end in the figure). A plurality of holes (orifices) 42a is formed in the flange 42. In the barrel 40, the flange 42 having a large area contacts the sealing plate. Accordingly, the sealing plate can be more effectively supported. After the piston that slides inside the barrel 40 ruptures the sealing plate, the gas contained inside the bottle flows through the holes 42a.

A barrel 45 shown in FIGS. 5(D), 5(E), and 5(F) includes a cylindrical main body 46, and the diameter of an end portion 47 of the main body 46 at the end closer to the bottle (the end closer to the sealing plate, or the right end in the figure) is gradually reduced. The diameter of an end portion 48 of the main body 46 at the end further from the bottle (the end closer to the housing, or the left end in the figure) is gradually increased. In the barrel 45, the tip of a piston 50 is inside the barrel 45 before activation, and the tip of the piston 50 protrudes out from the opening formed in the end portion 47 of the barrel 45 after activation. The piston 50 sliding inside the main body 46 is stopped when it engages the end portion 47 which becomes narrower toward the end. Accordingly, the above-described flange portion, which is formed at the rear end of the piston, can be omitted and the shape of the piston can be simpler.

In addition, the above-described inflator allows, for example, the following modifications:

(1) the initiator is omitted and the piston is manually moved in order to break the sealing plate. This construction can be applied to such devices as extinguisher, life jacket, etc.

(2) the piston is disposed inside the bottle.

(3) the housing is attached to the side surface of the bottle, and the internal pressure of the bottle is increased by solid, liquid, fuel, etc., so as to break the sealing plate. In this case, the piston can be omitted.

As is apparent from the foregoing explanations, according to the present invention, an inflator in which a gas can be ejected and supplied linearly in the axial direction of a bottle without increasing the size and the manufacturing cost thereof can be provided.

While the invention has been explained with reference to the specific embodiments of the invention, the explanation is illustrative and the invention is limited only by the appended claims.

What is claimed is:

1. An inflator comprising:

a bottle for storing a high pressure gas having an opening, a sealing plate attached to the bottle for sealing the opening, a housing having a curved air passage therein, and an end, said housing being arranged such that the end faces the sealing plate, an initiator for generating an air blast disposed to communicate with the air passage, and a piston provided inside the housing to communicate with the curved air passage so that upon actuation of the initiator, the piston is urged toward the sealing plate by the air blast to rupture the same to allow the high pressure gas to linearly eject from the bottle.

2. An inflator according to claim 1, wherein said end of the housing has a size smaller than that of the opening to form a space therearound to substantially linearly eject the high pressure gas through the opening.

3. An inflator according to claim 2, further comprising a barrel attached to the housing and facing the sealing plate, said piston being located in the barrel.

4. An inflator according to claim 3, wherein said barrel contacts the sealing plate to support the same.

5. An inflator according to claim 4, further comprising a diffuser connected to the bottle for providing a passage of the high pressure gas ejected from the bottle.

6. An inflator according to claim 1, wherein said piston has a plurality of grooves on an outer surface thereof along a moving direction.

7. An inflator according to claim 1, wherein said piston has a shaft portion with a circular hole.

8. An inflator according to claim 3, wherein said barrel has a flange contacting the sealing plate, said flange having a plurality of holes to allow the gas in the bottle to pass therethrough.

9. An inflator according to claim 3, wherein said barrel has one end with gradually reduced diameter toward the sealing plate, and the other end with gradually increased diameter.

10. An inflator comprising:
- a cylindrical bottle for storing a high pressure gas having an opening at one side thereof,
- a sealing plate attached to the bottle for sealing the opening,
- a diffuser connected to the bottle adjacent to the sealing plate, and having a gas ejecting port at a side opposite to the opening of the bottle, and a circumferential surface located between the sealing plate and the gas ejecting port,
- a housing attached to the circumferential surface of the diffuser and having an inner end located in front of the sealing plate,
- an initiator for generating an air blast disposed in the housing, and
- a piston provided inside the housing so that upon actuation of the initiator, the piston is urged toward the sealing plate by the air blast to rupture the same to allow the high pressure gas to linearly eject from the bottle.

11. An inflator according to claim 10, further comprising a barrel attached to the housing and facing the sealing plate, said piston being located in the barrel.

12. An inflator according to claim 10, wherein said housing extends from the circumferential surface of the diffuser to the sealing plate.

13. An inflator according to claim 12, wherein said housing has a curved air passage.

* * * * *